United States Patent [19]

Kanamori et al.

[11] Patent Number: 5,253,170
[45] Date of Patent: Oct. 12, 1993

[54] APPARATUS FOR COMPUTERIZED TOMOGRAPHY, METHOD OF SAME, AND APPARATUS FOR COMPUTERIZED TOMOGRAPHY SCANNING

[75] Inventors: Takahiro Kanamori, Katsuta; Shinichi Itoh, Kawasaki, both of Japan

[73] Assignee: Hitachi, Ltd., Tokyo, Japan

[21] Appl. No.: 669,623

[22] Filed: Mar. 14, 1991

[30] Foreign Application Priority Data

Mar. 14, 1990 [JP] Japan .................................. 2-60975

[51] Int. Cl.$^5$ .................................. G06F 15/00
[52] U.S. Cl. .................. 364/413.16; 364/413.14; 364/413.15
[58] Field of Search .............. 364/413.13, 413.14, 364/413.15, 413.16

[56] References Cited

U.S. PATENT DOCUMENTS

| | | | |
|---|---|---|---|
| 4,149,248 | 4/1979 | Pavkovich | 364/414 |
| 4,841,553 | 6/1989 | Nagai | 378/19 |
| 5,025,463 | 6/1991 | Saito et al. | 378/19 |

Primary Examiner—Roy N. Envall, Jr.
Assistant Examiner—Ari M. Bai
Attorney, Agent, or Firm—Antonelli, Terry, Stout & Kraus

[57] ABSTRACT

With the apparatus of CT, if the object contains a foreign body having high spatial frequency component such as a polygonal body etc., and large density difference from another region, a radial artifact is generated from a corner part of the side.

The first object of the present invention is to provide an apparatus of CT to reduce artifacts without lowering of spatial resolving power.

The second object of the present invention is to provide an apparatus of CT to reduce artifacts without increasing scanning time so much.

The objects described above are achieved by the present invention with a method to disperse penetration data to surroundings when a sudden changing part of penetration data in translational data is detected in collecting penetration data from every direction for reconstruction of an image.

21 Claims, 5 Drawing Sheets

APPARATUS FOR COMPUTERIZED TOMOGRAPHY, METHOD OF SAME, AND APPARATUS FOR COMPUTERIZED TOMOGRAPHY SCANNING

BACKGROUND OF THE INVENTION

The present invention relates to an apparatus for computerized tomography (called an apparatus of CT hereafter), especially to an apparatus of CT for an object having large density difference, which is preferable for reducing radial false image (called artifact hereafter) appearing in a reconstructed image, and a method of same.

An apparatus of CT is an apparatus for irradiating an object with waves such as electromagnetic wave, ultrasonic wave, and light wave from a radiation source, detecting penetration data to show strength of penetration of the wave with a detector, obtaining the penetration data from every direction, processing a plurality of the penetration data, and reconstructing sliced image of the object. For obtaining the penetration data from every direction by the apparatus of CT, the detector is installed facing to the radiation source with a separation at midst of which the object is inserted, and at least one of the detectors and the radiation source is rotated and scanned at regular intervals and obtain a series of penetration data in a range at every rotation. A series of the penetration data is called translational data hereafter.

With the apparatus of CT described above, if the object contains a foreign body having high spatial frequency component (for example, existing of a body shaped to have sides like as quadrilateral, triangle, and needle-shape, etc.) and large density difference from another region, a radial artifact is generated from a corner part of the side. The artifact is not existing actually in the object, and affects not only the generating point but also other part of the object. The generation of artifact is regarded as having different density from surroundings, and density resolving power at the point where the artifact generated becomes worse. Especially reconstructed image is blurred at the region of sides of the foreign body, in other words, spatial resolving power becomes worse.

To solve more or less the problem described above, there is a method as a prior art to affect a high frequency shielding type spatial filter when reconstruct image from a plurality of penetration data and to flatten the reconstructed image itself.

By the prior art described above, there was a problem that other part was also flattened concurrently and spatial resolving power of the other part became inferior although the aimed artifact is reduced.

Also, considering that an essential cause to yield artifacts is obtaining penetration data dispersedly, a method to increase number of the penetration data in order to close the penetration data as continuous as possible is thought. But the method increases scanning time of a detector to obtain a reconstructed image and is not adequate for an apparatus of CT which has an essential requirement to shorten scanning time. Further, if high energy radiation is used, large pitch of detectors are necessary by an effect of dispersed radiation at the detectors, and it is impossible to increase number of the penetration data.

SUMMARY OF THE INVENTION

The first object of the present invention is to provide an apparatus of CT to reduce artifacts without lowering of spatial resolving power.

The second object of the present invention is to provide an apparatus of CT to reduce artifacts without increasing scanning time so much.

The objects described above are achieved by the present invention with a method to disperse penetration data to surroundings when a sudden changing part of penetration data in translational data is detected in collecting penetration data from every direction for reconstruction of an image.

To make it easier to understand feature of the present invention, a method to reconstruct sliced image by an apparatus of CT is explained using FIG. 1 and 3. There are many various type of apparatus of CT in number of detectors, radiation source, and scanning method of detectors etc. Here, the explanation is based on so-called an apparatus of CT of second generation which uses a group of detectors including a plurality of detectors as shown in FIG. 1, a radiation source which rotate, scan, and translate synchronously with the detectors, and X-ray as the radiation source, for an example. Even though whatever shape of an object may be acceptable, a circular object including inside a foreign body of tetragonal shape having large difference in density is assumed in the present explanation for easy understanding. A plurality of penetration data I shown in equation (1) is accumlated by obtaining translational data from the group of detectors 12 for 360° at every regular angle of rotation.

$$I = I_0 \exp(-\mu l) \quad (1)$$

where, $I_0$: Strength of X-ray of radiation source
$\mu$: Linear absorption coefficient of the object
$l$: Length of penetration path of X-ray The linear absorption coefficient $\mu$ is response to density, and a high density material has large $\mu$ as it absorbs X-ray much. Therefore, the penetration data I indicates a value in response to an average density of the part where X-ray penetrates. After the linear absorption coefficient $\mu(x, y)$ (called CT value hereinafter) in response to the density of each position in the object is calculated with using the penetration data, and subsequently light and shade or colors is classified in response to the CT value to reconstruct a sliced image. CT value is obtained by equation (2).

$$\mu(x, y) = \sum_\theta \sum_t P(\theta, t)/N \quad (1)$$

where, $t = x \cos\theta + y \sin\theta$
P: logarithm of attenuation rate of penetration data ($\propto \mu l$)
$\theta$: Angle of rotary scanning
N: Number of rotation In other words, as $\Sigma\Sigma P(\theta, t)$ expresses a sum of P of penetration data through an aimed position (x, y), that is, a sum of linear absorption coefficient $\mu$ at the position, division of the sum by the number of penetration data N at the position expresses linear absorption coefficient $\mu$ at the aimed position to obtain by the equation (2), and hence, the density is obtained. Therefore, penetration data through a body having large difference in density are scattered uniformly to both of a part of high density and to another part of low density, and the scattering causes erroneous information and generates artifacts around the body having large difference in density. But, the artifacts can be eliminated by applying a filter function h(t) to the equation (2) as a correction function.

But, a radial artifact generated from a corner of a body having different density, which is the object of the present invention, is unable to be eliminated with the filter function. As X-ray beam detected by a detector has a width, when a part of the beam having a width crosses over a side of the tetragonal body having different density shown in FIG. 3, the penetration data represent all position through the crossing path of the beam and underestimate at the position where the beam crossed and overestimate at another position. The apparent abnormal data generate the radial artifact. The influence described above is remarkable when the difference in density of the body having different density and of the surroundings is large. The artifact is generated from the corner of the body having different density at every position of rotary scanning as shown in FIG. 3, and is strongest at the position on a same line with the side of the body and becomes weak as leaving from the same line. The radial artifact becomes weak as making the pitch of the rotary scanning small effectively. That is, by increasing number of the penetration data at the artifact generating part, the influence of the artifact which is concentrated previously to small number of penetration data is dispersed to a large number of penetration data, and the artifact is reduced. And, according to the theory of the artifact generation as described above, if the beam width is made narrow, the penetration data can be obtained finely and the influence of the radial artifact can be reduced. In the case, if a large number of translational data are taken, it generally becomes necessary to make the pitch of the rotary scanning small.

Therefore, by considering all of the things described above together, the influence of the radial artifact can be reduced by dispersing values of the penetration data of the sudden changing part in the translational data to the surroundings, in other words, closing the penetration data at the sudden changing part to continuousness.

DETAIL DESCRIPTION OF PREFERRED EMBODIMENTS

Hereinafter, the present invention is explained with embodiments.

Figure 2:
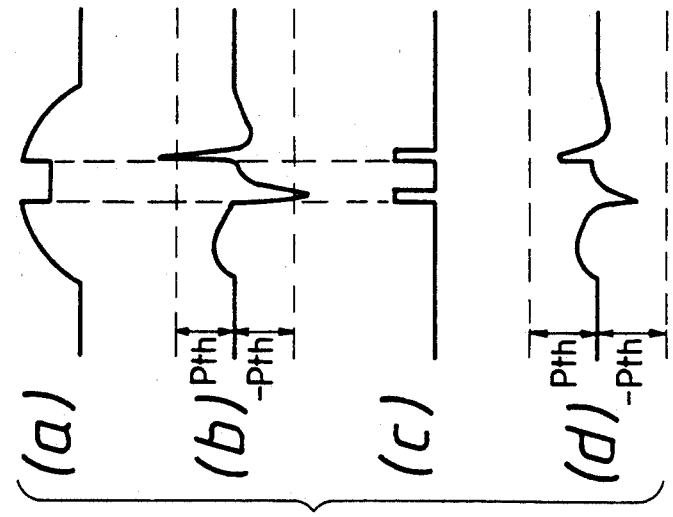
FIG. 2 is a drawing illustrating the content of processing in FIG. 1.

As the first embodiment, an example to detect a position of artifact generation from translational data which are obtained in every rotary scanning, and subsequently, to increase number of the translational data at positions after the position of artifact generation is detected. That is, an example to reduce the artifact by making the pitch of the rotary scanning $\Delta\theta$ small is explained with using FIG. 1 and 2.

Figure 1:
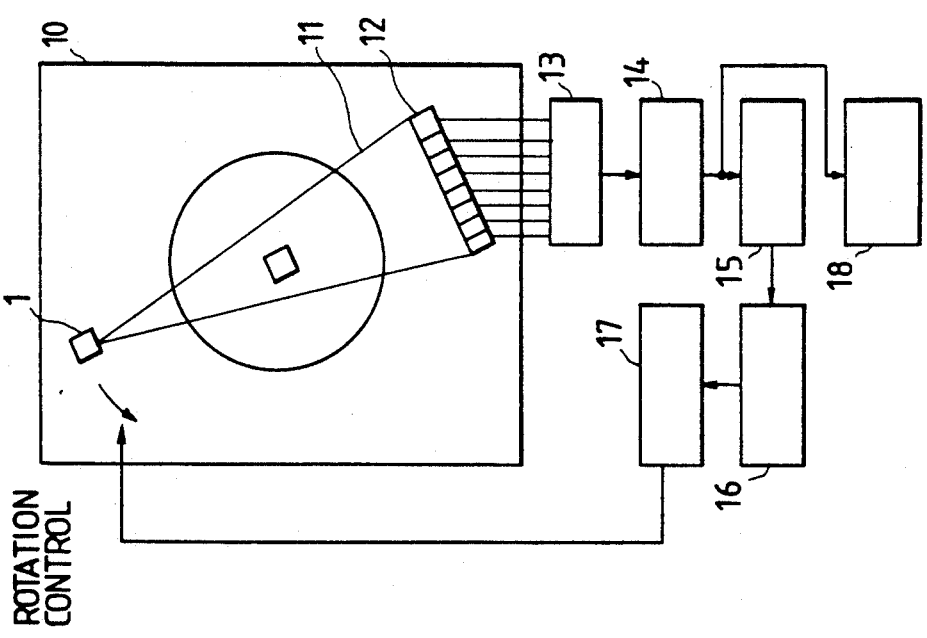
FIG. 1 is a schematic block diagram illustrating an embodiment of the present invention.

FIG. 1 is a block diagram of the present embodiment showing an example of a case using CT scanning (so-called a scanning method of second generation type) which comprises a fan beam radiation 11 and a plurality of detectors groups 12. Shapes of an object 3 and a body having different density 7 are, as same as explained in the article of the operation, circular for the former and tetragonal for the latter In an apparatus of CT of the second generation type, a CT scanner 10 scans with rotation of every $\Delta\theta°$ in keeping of a similar relative configuration of a radiation source 1 with the detectors group 12. Penetration data from the detectors group 12 are collected by a data collector 13 and calculation of a logarithmic conversion value, $P(t, \theta)$, of $I/I_0$ ratio obtained from equation (1) (hereinafter the $l_n (I/I_0)$ is called logarithmic penetration data) is performed by a logarithmic convertor 14. The profile of the $P(t, \theta)$ is like as (a) shown in FIG. 2. Subsequently, the $P(t, \theta)$ is differentiated by a spatial differentiator 15 ((b) in FIG. 2). At a comparator 16, a threshold value level $P_{th}$ and the differential coefficient which is obtained by differentiation with the spatial differentiator 15 described above are compared each other, and, when the differential coefficient is larger than the $P_{th}$, a signal is transmitted ((b) and (c) in FIG. 2). In other words, a sudden changing part in the translational data existing.

Figure 3:
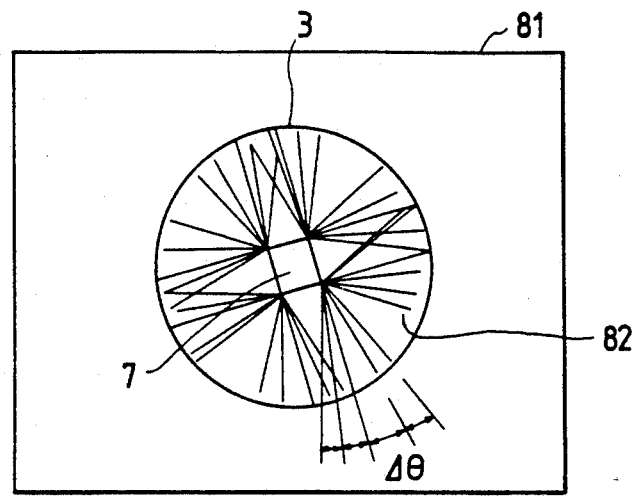
FIG. 3 is a schematic drawing illustrating an embodiment of an object and a state of artifact generation.

The differentiation described above emphasizes noises (statistical noise, instrumentation circuit noise etc.) in penetration data, but as the noises have random characteristics, the problem is avoided by performing integration after the differentiation. A control mechanism of rotation 17 stops motion to scan with an angle pitch of every $\Delta\theta$ at the moment of receiving the signal from the comparator 16, and subsequently starts to collect penetration data from the position by more fine scanning with a proper angle pitch $\Delta\delta$ (where $\Delta\delta < \Delta\theta$) which has been set before starting of the scanning. The fine scanning is continued till the differential coefficient decreases below the threshold value level $P_{th}$ as shown as (d) in FIG. 2. The value of $\Delta\delta$ may be decided depending on changing rate of the penetration data. That is, a small $\Delta\delta$ is taken when the changing rate is large, and a large $\Delta\delta$ is taken when the changing rate is small. When a calculator for image reconstruction 18 performs calculation for reconstruction of image with equation (2), as the interval where the scanning has been performed with the angle pitch of $\Delta\delta$ has larger number of projection data than the interval where the scanning has been performed with the angle pitch of $\Delta\theta$, images are reconstructed with reducing of weight of the penetration data on the interval where the scanning has been performed with $\Delta\delta$. The sudden changing part of the penetration data is detected at an angle of rotary scanning $\theta_n$, and supposing that the subsequent rotary scanning till the angle of rotary scanning $\theta_{n+1}$ with $\Delta\delta$ ($=\Delta\nu/k$) is performed, each of logarithmic penetration data for reconstruction of image is expressed by following equation.

$$P(t, \theta) = \begin{cases} P(t, \theta_m) & (m = 1\sim n, n+1\sim) \\ P(t, \theta_{nl})/k & (l = 1, 2, \ldots k) \end{cases} \quad (3)$$

where, $\theta_{nl} = \theta_{n+l} \cdot \Delta\delta$ $\theta_{nk} = \theta_{n+1}$ By performing the procedure described above, a line of artifact showed on a faceplate of a CRT 81 is fainted as the influence of the artifact which has been concentrated formerly to a line is dispersed to k lines and smoothed by making the $\Delta\theta$ in FIG. 3 fine. Accordingly, the influence of the artifact is reduced. And in the present embodiment, the part generating artifacts can be fixed automatically by a simple procedure. Further, more precise reconstructed image can be obtained because actual penetration data can be collected by the scanning.

In the embodiment described above, the range of fine scanning of $\Delta\delta$ is from the angle of rotary scanning $\theta_n$, where a part of sudden changing of penetration data in the translational data is existing, to the subsequent angle of rotary scanning $\theta_{n+1}$, while by extending the range of fine scanning to further next angle of rotary scanning or to the prior angle to the angle of rotary scanning $\theta_n$, the influence of the artifacts can be reduced further. Even though the extension of the range of the fine scanning requires long scanning time, the extension is effective especially when the influence of the artifacts is large because of remarkable reduction effect. When fine scanning is performed at the position prior to the angle of the rotary scanning $\theta_n$, the scanning is discontinued once at the position of $\theta_n$ and restarted after returning back to a proper rotary position (generally about 5°).

Figure 4:
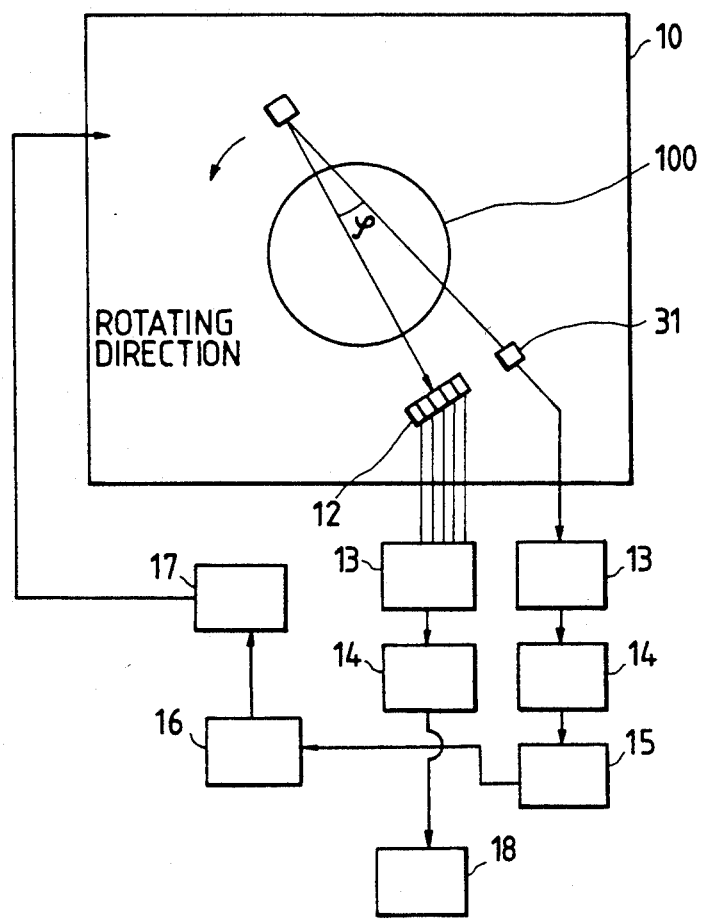
FIG. 4 is a schematic block diagram illustrating another embodiment of the present invention.

Next, the second embodiment which uses a detector for navigation to detect a foreign body, which has large density difference and high spatial frequency component, in addition to the group of detectors 12 for detection of the penetration data is explained with using FIG. 4.

In FIG. 4, a detector for navigation 31 (acceptable plurality) is installed at a position prior of $\phi$ to the group of detectors 12. The detector for navigation 31 detects a series of penetration data in a range corresponding to the angle of rotary scanning $\Delta\theta$ when performing the rotary scanning. A series of the penetration data is equivalent to the translational data in the first embodiment. Therefore, as same as the first embodiment, a position to generate an artifact is detectable previously by processing a series of the penetration data through a logarithmic convertor 14, a spatial differentiator 15, and a comparator 16. Accordingly, in the present embodiment, the influence of the artifacts can be reduced by making the pitch of angle of rotary scanning small when the detectors for image reconstruction 12 comes at the angle of rotary scanning where the detector for navigation 31 detected the position to generate the artifact previously.

Figure 5:
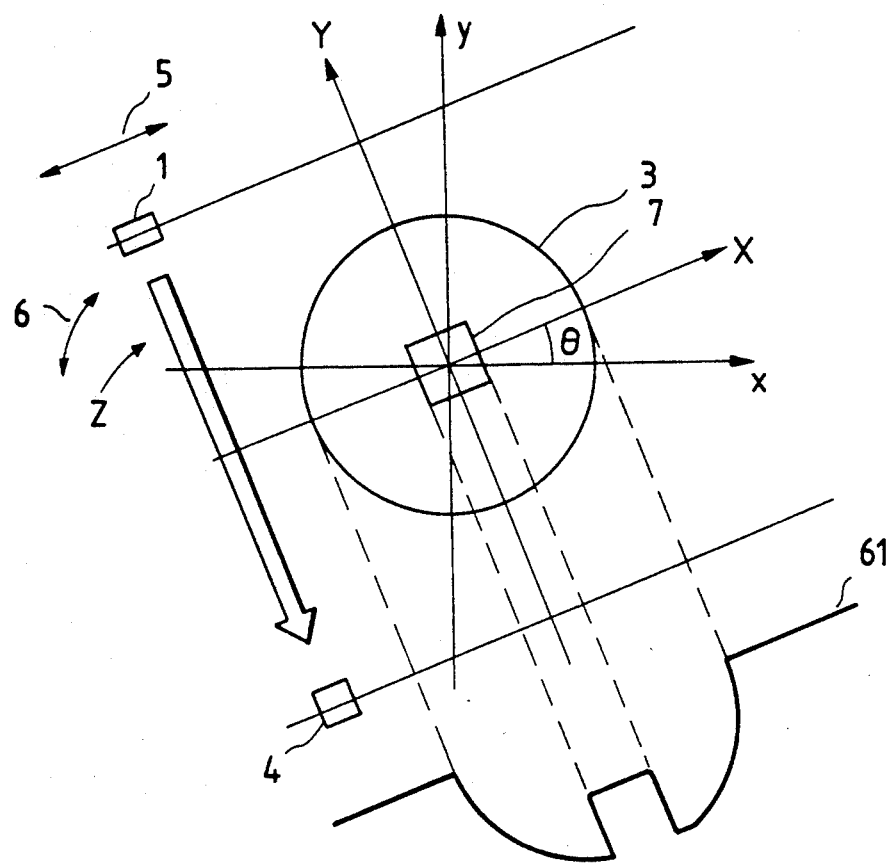
FIG. 5 is a drawing illustrating translational data when the present invention is applied to an apparatus of CT of the first generation.
Figure 6:
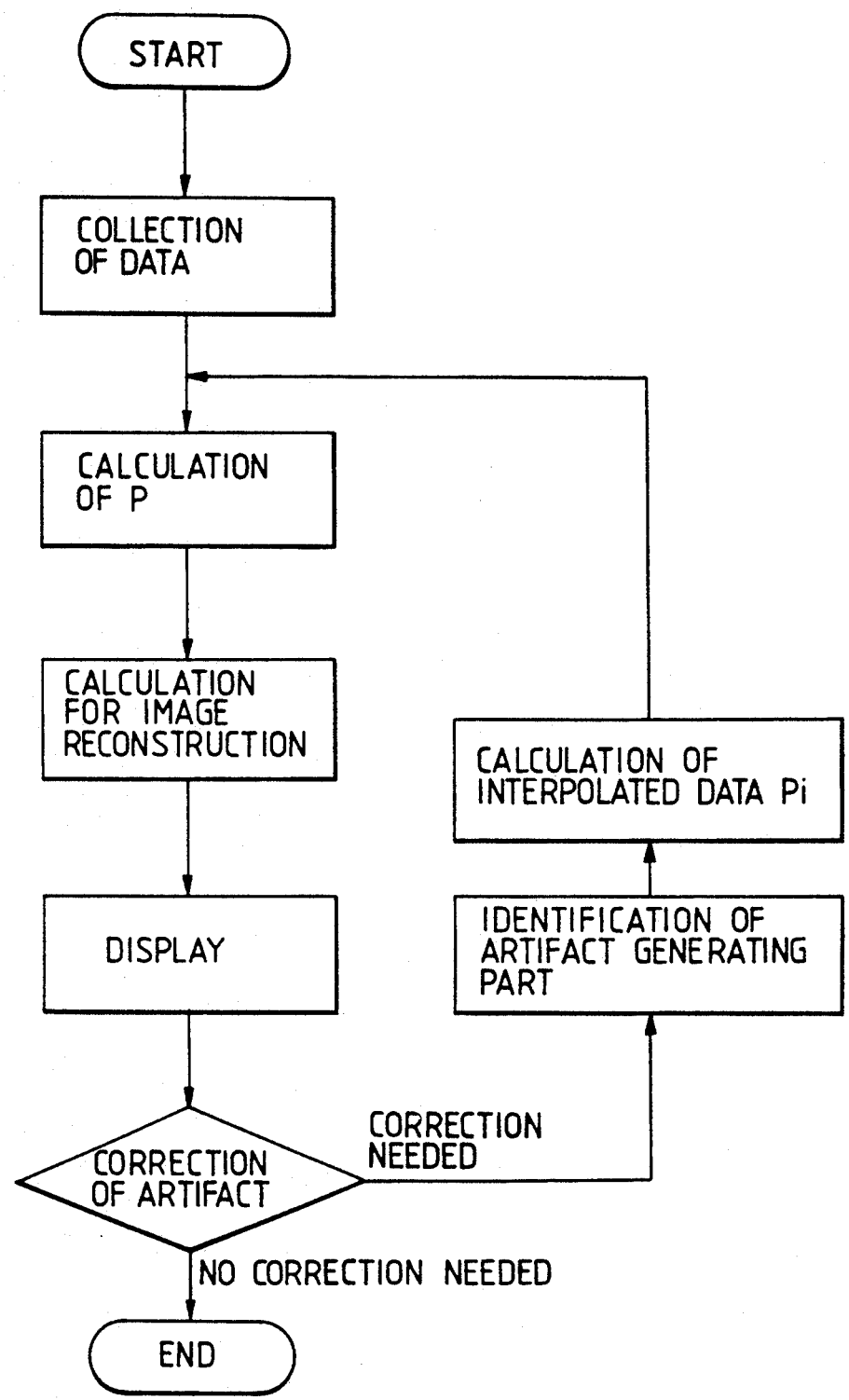
FIG. 6 is a flow diagram illustrating the process flow in the third embodiment of the present invention.

Further, as the third embodiment, an example to increase effectively the number of the translational data is explained with using FIG. 5 and 6.

In the present embodiment, a so-called apparatus of CT of first generation which uses a detector is quoted. A radiation 2 from a radiation source 1 penetrates an object 3, and the radiation is detected by a detector 4 which is installed at a position facing to the radiation source 1 with an interval wherein the object 3 is placed at the middle. The radiation source 1 and the detector 4 collect penetration data of the radiation 2 on every direction of the object 3 by performing linear (translational) scanning 5 and rotary scanning 6. In FIG. 5, xy coordinates is used when the angle of the rotary scanning is 0, and XY coordinates is used when the angle of the rotary scanning is $\theta$. In the present embodiment, when a position generating an artifact is determined, the data collected at every $\Delta\theta$ are treated with an interpolating procedure and accomplish reduction of influence of shadow by further fractionization of the artifact 82 which is appeared at every $\Delta\theta$ as shown in FIG. 3. The interpolating procedure is performed with a following equation.

$$P_i(t, \theta_i) = \frac{k-i}{k} P(t, \theta_n) + \frac{i}{k} P(t, \theta_{n+1}) \quad (4)$$

$(i = 1, 2, \ldots, k-1)$

Where, $P_i(t, \theta_i)$ are interpolated logarithmic penetration data, and k is the number of division of the angle of rotary scanning between $\theta_n$ and $\theta_{n+1}$. Identification of the position generating the artifact may be performed as same as the embodiment 1, but in addition, the identification can be achieved with pointing out of the position generating the artifact on the faceplate of the CRT 81 by an operator.

The flow of procedure in the present embodiment is shown in FIG. 6. Among the flow, the calculation for image reconstruction is essentially performed with equation (2) which is affected by the filter function h(t). In the case, as the part interpolated with equation (4) is increased in number of penetration data on the part as same as the first embodiment, weight of the data is reduced with $P = P_i/k$ and processed.

According to the third embodiment, as $\Delta\theta$ in FIG. 3 is fractionized effectively and a measure of smoothing with interpolation is applied to only a very limited range in the conventional calculation for image reconstruction, influence of deterioration in spatial resolving power and density resolving power, which are problems in prior art using a measure to smooth the whole image, are very scarce and the initial object to reduce artifacts can be achieved.

Figure 8:
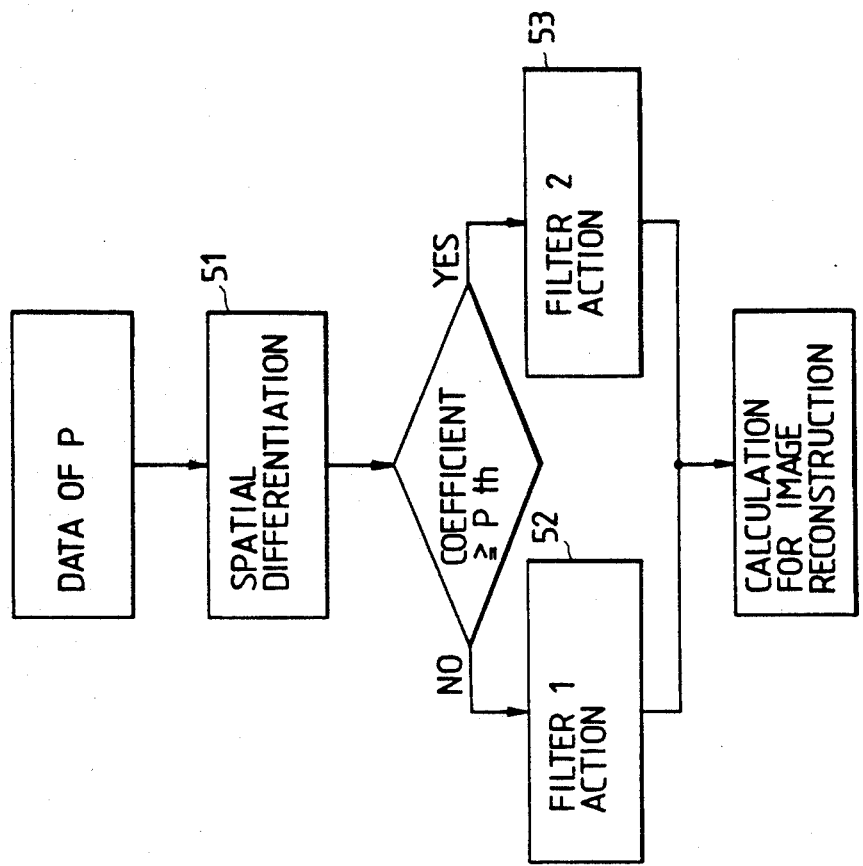
FIG. 8 is a flow diagram illustrating the process flow in the fourth embodiment.
Figure 7:
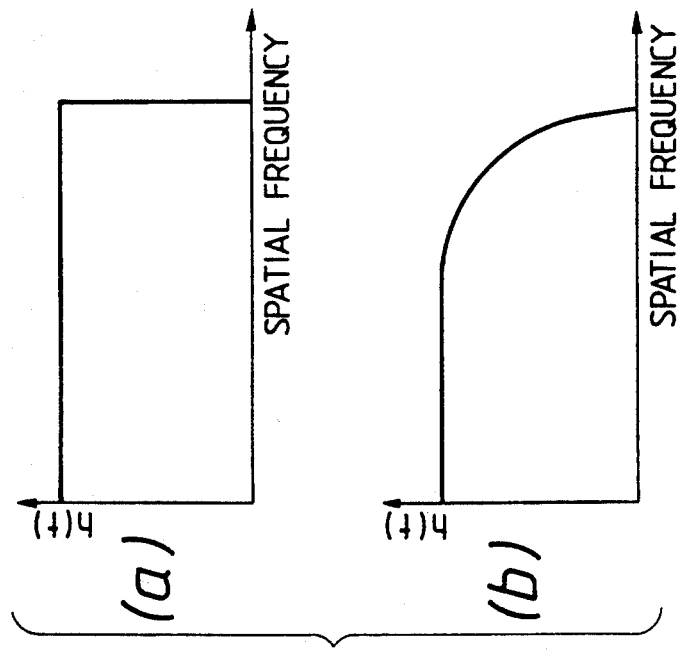
FIG. 7 is a drawing illustrating the filter function in the fourth embodiment.

The fourth embodiment of the present invention is explained next. In all of the embodiments described before, the data of rotation is increased by making the pitch of rotation fine or by interpolation at the surroundings of the part of sudden change in penetration data, in other words at the surroundings of the rotary position having high spatial frequency in penetration data. But in the present embodiment, the pitch of rotation is not made fine, and a filter function having more weakened characteristics at high frequency than the filter function used in other position is intended to be affected to the penetration data at the position having high spatial frequency in penetration data. Accordingly, a filter of high frequency resonance type as shown as (a) in FIG. 7 is preferably used to a penetration data having not so high spatial frequency, and a filter of high frequency suppressing type as shown as (b) in figure 7 is used to a penetration data having high spatial frequency as the filter function h(t). The processing method is shown in FIG. 8. That is, the filter 2 ((b) in FIG. 7) is affected when the spatial differential value of the penetration data is equal to or larger than a designated value; and when equal to or smaller than a designated value, the filter 1 ((a) in FIG. 7) is affected. The method of spatial differentiation is the same as the method shown in FIG. 1 and 2.

And the filter 1 and the filter 2 are concretely corresponding to (a) and (b) in FIG. 7 respectively.

With the present embodiment described above, even though deterioration in spatial resolving power and density resolving power by being influenced with the filter 2 to other position in addition to the aimed position are observed more or less, the artifacts can be reduced by a simple process to change filter functions.

All of the embodiment described above were explained with taking apparatus of CT of the first generation or the second generation for examples, but the present invention is naturally applicable to an apparatus of CT of the third generation which uses a wide angle fan beam and performs only rotary scanning, and to an apparatus of CT of the fourth generation and to other apparatus of CT as well.

As described above, the present invention provides an apparatus of CT which enables to reduce artifacts without lowering spatial resolving power by increasing number of penetration data at a part generating the artifacts.

Further, the apparatus of CT which enables to reduce artifacts without increasing scanning time so much is able to be provided.

What is claimed is:

1. A computerized tomography apparatus comprising:
   a radiation source for emitting radiation;
   a detector disposed facing the radiation source with a space therebetween, an object being disposed in the space such that the radiation from the radiation source passes through the object and is incident to the detector, the detector outputting penetration data indicative of a penetration strength of the radiation through the object;
   means for rotating at least one of the radiation source and the detector to a plurality of rotary positions relative to the object;
   means for scanning at least one of the radiation source and the detector at each of the rotary positions such that the detector outputs a plurality of penetration data at each of the rotary positions, the plurality of penetration data output by the detector at two or more of the rotary positions constituting translational data;
   means for detecting a sudden change in penetration data in the plurality of penetration data output by the detector at each of the rotary positions;
   means for temporarily increasing a number of translational data before and after one of the rotary positions at which the detecting means detects a sudden change in penetration data; and
   means for processing translational data constituting the plurality of penetration data output by the detector at all of the rotary positions to reconstruct a sliced image of the object.

2. A computerized tomography apparatus comprising:
   a radiation source for emitting radiation;
   a detector disposed facing the radiation source with a space therebetween, an object being disposed in the space such that the radiation from the radiation source passes through the object and is incident to the detector, the detector outputting penetration data indicative of a penetration strength of the radiation through the object;
   means for rotating at least one of the radiation source and the detector to a plurality of rotary positions relative to the object;
   means for scanning at least one of the radiation source and the detector at each of the rotary positions such that the detector outputs a plurality of penetration data at each of the rotary positions, the plurality of penetration data output by the detector at two or more of the rotary positions constituting translational data;
   means for detecting an intense change in a density of the object;
   means for temporarily increasing a number of translational data relating to a part of the object at which the intense change in density detected by the detecting means occurs; and
   means for processing translational data constituting the plurality of penetration data output by the detector at all of the rotary positions to reconstruct a sliced image of the object.

3. A computerized tomography apparatus comprising:
   a radiation source for emitting radiation;
   a detector disposed facing the radiation source with a space therebetween, an object being disposed in the space such that the radiation from the radiation source passes through the object and is incident to the detector, the detector outputting penetration data indicative of a penetration strength of the radiation through the object;
   means for rotating at least one of the radiation source and the detector to a plurality of rotary positions relative to the object;
   means for scanning at least one of the radiation source and the detector at each of the rotary positions such that the detector outputs a plurality of penetration data at each of the rotary positions, the plurality of penetration data output by the detector at two or more of the rotary positions constituting translational data;
   means for detecting a high spatial frequency in the object;
   means for temporarily increasing a number of translational data relating to a part of the object at which the high spatial frequency detected by the detecting means occurs; and
   means for processing translational data constituting the plurality of penetration data output by the detector at all of the rotary positions to reconstruct a sliced image of the object.

4. A computerized tomography apparatus comprising:
   a radiation source for emitting radiation;
   a detector disposed facing the radiation source with a space therebetween, an object being disposed in the space such that the radiation from the radiation source passes through the object and is incident to the detector, the detector outputting penetration data indicative of a penetration strength of the radiation through the object;

means for rotating at least one of the radiation source and the detector to a plurality of rotary positions relative to the object at a controllable rotary pitch;

means for scanning at least one of the radiation source and the detector at each of the rotary positions such that the detector outputs a plurality of penetration data at each of the rotary positions, the plurality of penetration data output by the detector at two or more of the rotary positions constituting translational data;

means for detecting an artifact generated by a part of the object;

means for temporarily decreasing the rotary pitch of the rotating means in a vicinity of the part of the object generating the artifact detected by the detecting means; and means for processing translational data constituting the plurality of penetration data output by the detector at all of the rotary positions to reconstruct a sliced image of the object.

5. A computerized tomography apparatus comprising:

a radiation source for emitting radiation;

a detector disposed facing the radiation source with a space therebetween, an object being disposed in the space such that the radiation from the radiation source passes through the object and is incident to the detector, the detector outputting penetration data indicative of a penetration strength of the radiation through the object;

means for rotating at least one of the radiation source and the detector to a plurality of rotary positions relative to the object;

means for scanning at least one of the radiation source and the detector at each of the rotary positions such that the detector outputs a plurality of penetration data at each of the rotary positions, the plurality of penetration data output by the detector at two or more of the rotary positions constituting translational data;

means for detecting a change in a density of the object, the change in density being produced by a part of the object having a border and a density which is different from a density of a portion of the object surrounding the part of the object;

means for temporarily increasing a number of translational data in a vicinity of the border of the part of the object producing the change in density detected by the detecting means; and means for processing translational data constituting the plurality of penetration data output by the detector at all of the rotary positions to reconstruct a sliced image of the object.

6. A computerized tomography apparatus comprising:

a radiation source for emitting radiation;

a detector disposed facing the radiation source with a space therebetween, an object being disposed in the space such that the radiation from the radiation source passes through the object and is incident to the detector, the detector outputting penetration data indicative of a penetration strength of the radiation through the object;

means for rotating at least one of the radiation source and the detector to a plurality of rotary positions relative to the object;

means for scanning at least one of the radiation source and the detector at each of the rotary positions such that the detector outputs a plurality of penetration data at each of the rotary positions, the plurality of penetration data output by the detector at two or more of the rotary positions constituting translational data;

means for providing a high spatial resolution by dispersing a sudden change in penetration data in the plurality of penetration data output by the detector at one of the rotary positions to the plurality of penetration data output by the detector at at least other one of the rotary positions in a vicinity of the one of the rotary positions; and means for processing translational data constituting the plurality of penetration data output by the detector at all of the rotary positions to reconstruct a sliced image of the object.

7. A computerized tomography apparatus comprising:

a radiation source for emitting radiation;

a detector disposed facing the radiation source with a space therebetween, an object being disposed in the space such that the radiation from the radiation source passes through the object and is incident to the detector, the detector outputting penetration data indicative of a penetration strength of the radiation through the object;

means for rotating at least one of the radiation source and the detector to a plurality of rotary positions relative to the object;

means for scanning at least one of the radiation source and the detector at each of the rotary positions such that the detector outputs a plurality of penetration data at each of the rotary positions, the plurality of penetration data output by the detector at two or more of the rotary positions constituting translational data;

means for detecting a change in a density of the object and a change in a spatial frequency of the object;

means for determining whether at least one of the change in the density of the object and the change in the spatial frequency of the object detected by the detecting means is greater than a predetermined value;

means for temporarily increasing a number of translational data at least after one of the rotary positions at which the determining means determines that at least one of the change in the density of the object and the change in the spatial frequency of the object detected by the detecting means is greater than a predetermined value; and means for processing translational data constituting the plurality of penetration data output by the detector at all of the rotary positions to reconstruct a sliced image of the object.

8. A computerized tomography apparatus comprising:

a radiation source for emitting radiation;

a detector disposed facing the radiation source with a space therebetween, an object being disposed in the space such that the radiation from the radiation source passes through the object and is incident to the detector, the detector outputting penetration data indicative of a penetration strength of the radiation through the object;

means for rotating at least one of the radiation source and the detector to a plurality of rotary positions relative to the object;

means for scanning at least one of the radiation source and the detector at each of the rotary positions such that the detector outputs a plurality of penetration data at each of the rotary positions, the plurality of penetration data output by the detector at two or more of the rotary positions constituting translational data;

means for detecting a change in a density of the object and a change in a spatial frequency of the object;

means for determining whether at least one of the change in the density of the object and the change in the spatial frequency of the object detected by the detecting means is greater than a predetermined value;

means for temporarily increasing a number of translational data in a vicinity of one of the rotary positions at which the determining means determines that at least one of the change in the density of the object and the change in the spatial frequency of the object detected by the detecting means is greater than a predetermined value; and means for processing translational data constituting the plurality of penetration data output by the detector at all of the rotary positions to reconstruct a sliced image of the object.

9. A computerized tomography apparatus comprising:

a radiation source for emitting radiation;

a detector disposed facing the radiation source with a space therebetween, an object being disposed in the space such that the radiation from the radiation source passes through the object and is incident to the detector, the detector outputting penetration data indicative of a penetration strength of the radiation through the object;

means for rotating at least one of the radiation source and the detector to a plurality of rotary positions relative to the object;

means for scanning at least one of the radiation source and the detector at each of the rotary positions such that the detector outputs a plurality of penetration data at each of the rotary positions, the plurality of penetration data output by the detector at two or more of the rotary positions constituting translational data;

means for detecting a change in a density of the object and a change in a spatial frequency of the object;

means for determining whether at least one of the change in the density of the object and the change in the spatial frequency of the object detected by the detecting means is greater than a predetermined value;

means for controlling the rotating means to rotate the at least one of the radiation source and the detector backwards by a predetermined amount from one of the rotary positions at which the determining means determines that at least one of the change in the density of the object and the change in the spatial frequency of the object detected by the detecting means is greater than a predetermined value, and for then controlling the rotating means to rotate the at least one of the radiation source and the detector forwards while temporarily increasing a number of translational data at least until the rotary position at which the determining means determined that at least one of the change in the density of the object and the change in the spatial frequency of the object detected by the detecting means is greater than a predetermined value; and means for processing translational data constituting the plurality of penetration data output by the detector at all of the rotary positions to reconstruct a sliced image of the object.

10. A computerized tomography apparatus comprising:

a radiation source for emitting radiation;

a detector disposed facing the radiation source with a space therebetween, an object being disposed in the space such that the radiation from the radiation source passes through the object and is incident to the detector, the detector outputting penetration data indicative of a penetration strength of the radiation through the object;

means for rotating at least one of the radiation source and the detector to a plurality of rotary positions relative to the object;

means for scanning at least one of the radiation source and the detector at each of the rotary positions such that the detector outputs a plurality of penetration data at each of the rotary positions, the plurality of penetration data output by the detector at two or more of the rotary positions constituting translational data;

means for detecting a change in a density of the object and a change in a spatial frequency of the object;

means for determining whether at least one of the change in the density of the object and the change in the spatial frequency of the object detected by the detecting means is greater than a predetermined value;

means for temporarily increasing a number of penetration data by interpolating translational data in an interval between ones of the rotary positions in a vicinity of one of the rotary positions at which the determining means determines that at least one of the change in the density of the object and the change in the spatial frequency of the object detected by the detecting means is greater than a predetermined value; and means for processing translational data constituting the plurality of penetration data output by the detector at all of the rotary positions to reconstruct a sliced image of the object.

11. A computerized tomography apparatus comprising:

a radiation source for emitting radiation;

a detector disposed facing the radiation source with a space therebetween, an object being disposed in the space such that the radiation from the radiation source passes through the object and is incident to the detector, the detector outputting penetration data indicative of a penetration strength of the radiation through the object;

means for rotating at least one of the radiation source and the detector to a plurality of rotary positions relative to the object;

means for scanning at least one of the radiation source and the detector at each of the rotary positions such that the detector outputs a plurality of penetration data at each of the rotary positions, the plurality of penetration data output by the detector at two or more of the rotary positions constituting translational data;

means for detecting as change in a density of the object and a change in a spatial frequency of the object;

means for determining whether at least one of the change in the density of the object and the change in the spatial frequency of the object detected by the detecting means is greater than a predetermined value;

means for temporarily increasing a number of penetration data by interpolating translational data in an interval between one of the rotary positions at which the determining means that at least one of the change in the density of the object and the change in the spatial frequency of the object detected by the detecting means is greater than a predetermined value and a succeeding one of the rotary positions; and means for processing translational data constituting the plurality of penetration data output by the detector at all of the rotary positions to reconstruct a sliced image of the object.

12. A computerized tomography apparatus according to claim 7, 8, 10 or 11, wherein the detector which outputs a plurality of penetration data at each of the rotary positions constitutes a first detector, and wherein the detecting means includes:

a second detector disposed in advance of the first detector relative to a rotating direction of the rotating means such that the radiation from the radiation source passes through the object and is incident to the second detector, the second detector outputting penetration data indicative of a penetration strength of the radiation through the object; and means for detecting a change in a density of the object and a change in a spatial frequency of the object based on the penetration data output by the second detector.

13. A computerized tomography apparatus according to claim 7, 8, 10 or 11, wherein the detecting means includes means for detecting a change in a density of the object and a change in a spatial frequency of the object based on the plurality of penetration data output by the detector at each of the rotary positions.

14. A computerized tomography apparatus comprising:

a radiation source for emitting radiation;

a detector disposed facing the radiation source with a space therebetween, an object being disposed in the space such that the radiation from the radiation source passes through the object and is incident to the detector, the detector outputting penetration data indicative of a penetration strength of the radiation through the object;

means for rotating at least one of the radiation source and the detector to a plurality of rotary positions relative to the object;

means for scanning at least one of the radiation source and the detector at each of the rotary positions such that the detector outputs a plurality of penetration data at each of the rotary positions, the plurality of penetration data output by the detector at two or more of the rotary positions constituting translational data; and means for processing translational data constituting the plurality of penetration data output by the detector at all of the rotary positions to reconstruct a sliced image of the object;

wherein the processing means includes means for applying a high frequency filter function only to penetration data indicative of a high spatial frequency of the plurality of penetration data output by the detector at all of the rotary positions.

15. A computerized tomography apparatus comprising:

a radiation source for emitting radiation;

a detector disposed facing the radiation source with a space therebetween, an object being disposed in the space such that the radiation from the radiation source passes through the object and is incident to the detector, the detector outputting penetration data indicative of a penetration strength of the radiation through the object;

means for obtaining penetration data from the detector from a plurality of directions relative to the object; and means for processing the penetration data obtained by the obtaining means to reconstruct a sliced image of the object;

wherein the processing means includes means for reducing an artifact in the reconstructed image generated by a part of the object by temporarily increasing a number of penetration data relating to the part of the object generating the artifact in the penetration data obtained by the obtaining means.

16. A computerized tomography apparatus comprising:

a radiation source for emitting radiation;

a detector disposed facing the radiation source with a space therebetween, an object being disposed in the space such that the radiation from the radiation source passes through the object and is incident to the detector, the detector outputting penetration data indicative of a penetration strength of the radiation through the object;

means for obtaining penetration data from the detector from a plurality of directions relative to the object; and means for processing the penetration data obtained by the obtaining means to reconstruct a sliced image of the object;

wherein the processing means includes means for obtaining a clear sliced image by smoothing only penetration data relating to a part of the object generating an artifact in the penetration data obtained by the obtaining means.

17. A computerized tomography method comprising the steps of:

disposing a detector facing a radiation source for emitting radiation with a space therebetween;

disposing an object in the space between the radiation source and the detector such that the radiation from the radiation source passes through the object and is incident to the detector, the detector outputting penetration data indicative of a penetration strength of the radiation through the object;

rotating at least one of the radiation source and the detector to a plurality of rotary positions relative to the object;

scanning at least one of the radiation source and the detector at each of the rotary positions such that the detector outputs a plurality of penetration data at each of the rotary positions, the plurality of penetration data output by the detector at two or more of the rotary positions constituting translational data;

detecting a sudden change in penetration data in the plurality of penetration data output by the detector at each of the rotary positions;

temporarily increasing a number of translational data in a vicinity of one of the rotary positions at which a sudden change in penetration data was detected in the detecting step; and processing translational data constituting the plurality of penetration data output by the detector at all of the rotary positions to reconstruct a sliced image of the object.

18. A computerized tomography method comprising the steps of:

disposing a detector facing a radiation source for emitting radiation with a space therebetween;

disposing an object in the space between the radiation source and the detector such that the radiation from the radiation source passes through the object and is incident to the detector, the detector outputting penetration data indicative of a penetration strength of the radiation through the object;

rotating at least one of the radiation source and the detector to a plurality of rotary positions relative to the object;

scanning at least one of the radiation source and the detector at each of the rotary positions such that the detector outputs a plurality of penetration data at each of the rotary positions, the plurality of penetration data output by the detector at two or more of the rotary positions constituting translational data;

detecting a change in a density of the object and a change in a spatial frequency of the object;

determining whether the change in the density of the object detected in the detecting step is greater than a predetermined value;

temporarily increasing a number of translational data in a vicinity of one of the rotary positions at which it was determined in the determining step that the change in the density of the object detected in the detecting step is greater than a predetermined value; and processing translational data constituting the plurality of penetration data output by the detector at all of the rotary positions to reconstruct a sliced image of the object.

19. A computerized tomography method comprising the steps of:

disposing a detector facing a radiation source for emitting radiation with a space therebetween;

disposing an object in the space between the radiation source and the detector such that the radiation from the radiation source passes through the object and is incident to the detector, the detector outputting penetration data indicative of a penetration strength of the radiation through the object;

obtaining penetration data from the detector from a plurality of directions relative to the object; and processing the penetration data obtained by the obtaining means to reconstruct a sliced image of the object;

wherein the processing step includes the step of obtaining a clear sliced image by smoothing only penetration data relating to a part of the object generating an artifact in the penetration data obtained in the obtaining step.

20. A computerized tomography method comprising the steps of:

disposing a detector facing a radiation source for emitting radiation with a space therebetween;

disposing an object in the space between the radiation source and the detector such that the radiation from the radiation source passes through the object and is incident to the detector, the detector outputting penetration data indicative of a penetration strength of the radiation through the object;

rotating at least one of the radiation source and the detector to a plurality of rotary positions relative to the object;

scanning at least one of the radiation source and the detector at each of the rotary positions such that the detector outputs a plurality of penetration data at each of the rotary positions, the plurality of penetration data output by the detector at two or more of the rotary positions constituting translational data;

detecting a change in a density of the object and a change in a spatial frequency of the object;

determining whether at least one of the change in the density of the object and the change in the spatial frequency of the object detected in the detecting step is greater than a predetermined value;

rotating the at least one of the radiation source and the detector backwards by a predetermined amount from one of the rotary positions at which it was determined in the determining step that at least one of the change in the density of the object and the change in the spatial frequency of the object detected in the detecting step is greater than a predetermined value, and then rotating the at least one of the radiation source and the detector forwards while temporarily increasing a number of translational data at least until the rotary position at which it was determined in the determining step that at least one of the change in the density of the object and the change in the spatial frequency of the object detected in the detecting step is greater than a predetermined value; and processing translational data constituting the plurality of penetration data output by the detector at all of the rotary positions to reconstruct a sliced image of the object.

21. A computerized tomography apparatus comprising:

a radiation source for emitting radiation;

a first detector disposed facing the radiation source with a space therebetween, an object being disposed in the space such that the radiation from the radiation source passes through the object and is incident to the detector, the detector outputting penetration data indicative of a penetration strength of the radiation through the object;

means for rotating at least one of the radiation source and the detector to a plurality of rotary positions relative to the object;

a second detector disposed in advance of the first detector relative to a rotating direction of the rotating means such that the radiation from the radiation source passes through the object and is incident to the second detector, the second detector outputting penetration data indicative of a penetration strength of the radiation through the object; and means for detecting a change in a density of the object based on the penetration data output by the second detector.

* * * * *